United States Patent Office 3,364,732
Patented Jan. 23, 1968

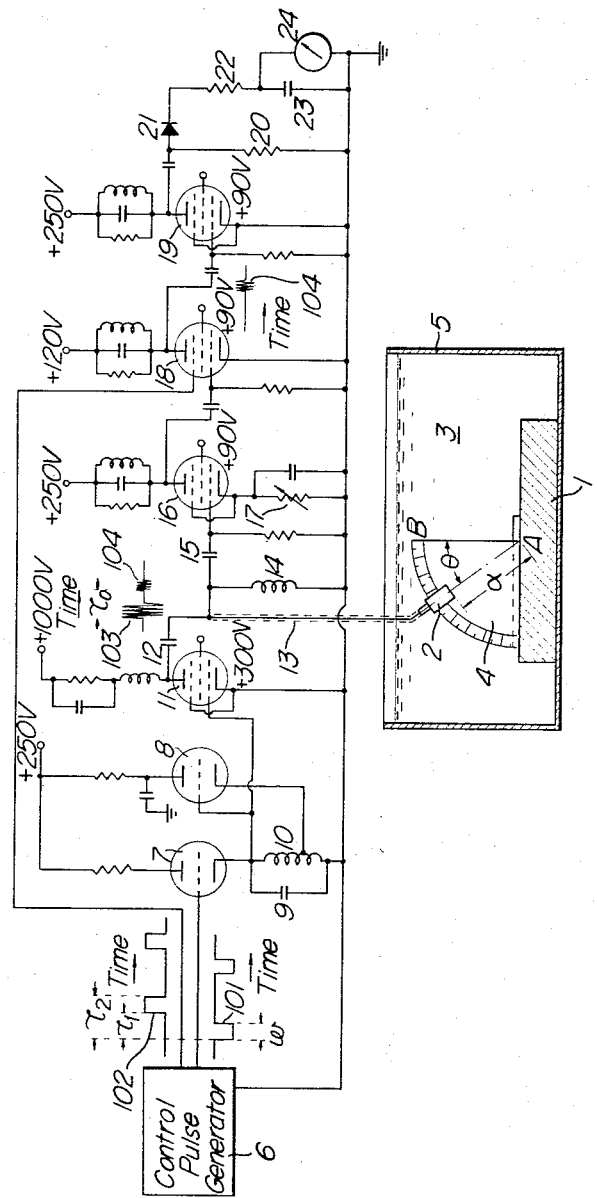

3,364,732
METHOD USING SUPERSONIC WAVES FOR MEASURING STRESS
Soji Sasaki, Hitachi-shi, Japan, assignor to Hitachi Ltd., Chiyoda-ku, Tokyo, Japan, a corporation of Japan
Filed Mar. 31, 1964, Ser. No. 356,283
Claims priority, application Japan, Apr. 3, 1963, 38/16,361
2 Claims. (Cl. 73—67.8)

This invention relates to a method for measuring the propagating velocity of surface waves by utilizing anomalous reflection of supersonic waves, and more particularly to a method for measuring the properties of materials relating to the propagating velocity of surface waves such as stress, the modulus of elasticity and the Poisson ratio.

Various methods have been heretofore known for measuring stress applied to structural material which methods involve measurement of tension or compression strain by means of a strain gauge and also by means of the strain formed in a crystal lattice by X-ray diffraction. The former method which utilizes measurement of tension or compression strain, however, has a disadvantage in that only the different strains existing in a measured body before and after application of external stress can be determined in this way and thus it is impossible to measure residual stress which is inherently in the body itself. Application of the latter method utilizing X-ray diffraction is restricted to those materials that have the same crystal structure as metal does. Moreover, with this method only the stress lying within the order of several tens of microns from the surface can be measured and hence industrial usefulness of the results measured with the latter method is relatively poor.

In contrast, the present method, which utilizes anomalous reflection of supersonic waves, is based upon the fact that the propagating velocity of surface waves in a measured body increases when compression stress exists in the body and decreases when tension stress exists in the body and this fact is utilized in accordance with the invention to measure stress present in a skin layer of the measured body by determining through measurement of the angle of anomalous reflection the propagating velocity of the surface waves. The present invention has an advantage in that it is applicable whether the measured material be crystalline or not and also regardless of whether the stress is residual or external.

Furthermore, the present invention has the advantage that industrial usefulness of its results is significant since stress existing within several millimeters from the surface in the measured body has a definite affect on the result so that the invention can provide more extensive information than those obtained by X-ray diffraction.

The present invention will be now described in more detail in conjunction with the accompanying drawing illustrating a circuit diagram of an apparatus for measuring stress.

Referring to the drawing, material, the stress of which is to be measured, is provided in a vessel 5 filled with a medium 3 which can transmit supersonic waves well. A transducer 2 comprising a piezoelectric oscillator element for receiving the supersonic waves is arranged on a goniometer 4 to measure an angle of incidence of the supersonic waves at a point A on the upper surface of the material 1. A control pulse generator 6 produces pulse signals 101 successively to operate a high frequency oscillator circuit composed of vacuum tubes 7 and 8, a condenser 9 and an inductance 10 only during the duration $\omega$ of the pulses. The high frequency oscillator circuit produces pulsed high frequency voltages of a frequency determined by tuning of the condenser 9 and the inductance. The pulsed high frequency voltage signals produced by the oscillator circuit are amplified by a vacuum tube 11 and the output of the tube 11 is fed to the transducer 2 through a condenser 12 and a cable 13. To the transducer 2 is applied a high frequency voltage of several hundred volts in peak-to-peak value. Thus, pulsed high frequency voltage signals 103 are applied to the transducer 2 successively and the transducer 2 transmits pulsed supersonic waves produced by the pulsed signals 103 toward the point A on the surface of the material 1. If the angle of incidence $\theta$ indicated by the goniometer 4 is varied, anomalous reflection waves from the point A may be received by the transducer at a particular angle $\theta'$. The time, $\tau_0$ at which each of the anomalous reflection waves are received by the transducer 2 is later than the time at which each of the pulsed supersonic signals are transmitted, where $\tau_0 = 2d/C_0$, and $C_0$ is sound velocity in water being 1480 m./s., that is constant, in water in temperature of 20° C., and $d$ is the distance between the transducer 2 and the point A. The value of inductance coil 14 is selected suitably to be tuned to the frequency of the supersonic waves to provide optimum sensitivity to receive the reflected waves by means of the transducer 2.

Vacuum tubes 16, 18 and 19 constitute a high frequency tuning amplifier for amplifying the reflected signal waves, the gain of which may be adjusted by means of a variable resistance 17. Since this amplifier is necessary only to amplify the reflected signal waves 104 and amplification of other noises is detrimental, the tube 18 is of double control type and effects amplification only in gate intervals containing the signals 104 by applying the gating pulse 102 produced in the control pulse generator 6 to the suppressor grid of the tube 18. Accordingly, such gating pulses must be such that the interval $\tau_1$ from the starting of the transmitted pulse 101 to starting of the gating pulse, is somewhat shorter than $\tau_0$ and the interval $\tau_2$, from the starting of the transmitted pulse 101 to termination of the gating pulse, is somewhat longer than $\tau_0 + \omega$.

Pulsed high frequency signals corresponding to the intensity of the reflected signals 104, appear across a resistance 20 at the output of the high frequency tuning amplifier. These pulsed high frequency signals are detected by a diode 21 and smoothed by a condenser 23 to operate an ammeter 24 to indicate the intensity of the signals. Thus indication of the ammeter 24 corresponds to the intensity of the reflected signals 104.

The particular angle $\theta'$ at which anomalous reflection occurs may be found by varying the angle of incidence $\theta$ and reading the value of $\theta$ at which the ammeter 24 deflects to a maximum by means of the goniometer 4.

The present inventor has found that when, with the above mentioned measuring apparatus, the angle of incidence $\theta$ indicated by the goniometer 4 is varied while supersonic waves from the transducer are impinging upon the surface of the material 1 at the point A, waves reflected at A and received by the transducer 2 becomes extraordinarily intense at the particular angle $\theta'$ within a range of angles which is slightly larger than the critical angle of transversal waves in the material 1. The present inventor has also found that while the value of the angle $\theta'$ depends upon the material of the article, there exists a relationship $\sin \theta' = C_0/C_r$, where $C_r$ denotes the propagating velocity of surface waves on the material 1. Measurements of several materials are given by way of example in the following table.

| Material | $\theta'$ (°) | Sin $c'$ | $C_r$ (m./s.) | $C_0/C_r$ |
|---|---|---|---|---|
| Steel | 30 | 0.500 | 2,980 | 0.497 |
| Aluminum | 31 | 0.515 | 2,880 | 0.514 |
| Copper | 44 | 0.694 | 2,120 | 0.698 |
| Brass | 49 | 0.755 | 1,920 | 0.770 |

Measured values of sin $\theta'$, $C_r$ and $C_0/C_r$ are described together in the table, and it is clearly seen that the above described relationship holds.

As apparent from the foregoing description, the measurement, according to the present invention, is characterized in that supersonic waves are caused to impinge upon a material, and an angle at which the intensity of the reflected waves reaches a maximum is measured and the propagating velocity $C_r$ of surface waves is obtained from the relationship $C_r = C_0/\sin \theta'$, where $C_0$ is sound velocity in a medium disposed between a transducer which generates the supersonic waves and the material. Accordingly, measurement of the propagating time of surface waves through a particular distance along the surface of the material in the prior art is unnecessary. The present method is applicable to articles of any shape to which the angle of incidence of a beam of supersonic waves may be measured to determine the progagating velocity of surface waves. Thus, the measuring method according to the present invention has an industrial advantage to provide significant information for determining the properties of materials relating to the propagating velocity of surface waves such as, for example, the stress in the material, the modulus of elasticity and the Poisson ratio.

What is claimed is:

1. A method for measuring the stress in a material, comprising the steps of, generating a beam of supersonic pulsed waves, transmitting said beam through a conductive medium to cause said beam to impinge upon the surface of said material, varying the angle of incidence of said beam upon the surface of said material, receiving and measuring the intensity of the pulses in the backwardly travelling wave along the same path of the incident pulse waves to determine the angle other than normal at which maximum reflected energy is detected from the point of incidence on the surface of said material and at which surface waves are generated in the material.

2. A method using supersonic waves for measuring the propagating velocity of surface waves in a material comprising the steps of generating a beam of supersonic pulsed waves, transmitting said beam through a conductive medium to cause said beam to impinge upon the surface of said material, varying the angle of incidence of said beam upon the surface of said material, receiving and measuring the intensity of the pulses in the backwardly travelling wave along the same path of the incident pulse waves for angles other than normal at which surface waves are generated, measuring the angle of maximum reflected energy in the backwardly travelling wave to determine the propagating velocity of surface waves according to the relation $$C_r = C_0/\sin \theta$$

where $C_r$ is the propagating velocity of surface waves, $C_0$ is the velocity of sound in the conductive medium and $\theta$ is the angle of the maximum reflected energy.

References Cited

UNITED STATES PATENTS

| 2,645,933 | 7/1953 | Avenberg | 73—67.8 |
| 3,041,872 | 7/1962 | Brown et al. | 73—67.9 |

OTHER REFERENCES

Carlin, Benson: Ultrasonics, 1960, McGraw-Hill, N.Y., pages 33–36, QC 244 C3.

McMaster, Robert C.: Nondestructive Testing Handbook, vol. 2, 1959, The Ronald Press Co., N.Y., Section 45, pages 10–12, TA 410 M32 C2.

RICHARD C. QUEISSER, *Primary Examiner.*

JOHN P. BEAUCHAMP, *Assistant Examiner.*